(12) United States Patent
Tran et al.

(10) Patent No.: US 12,195,048 B2
(45) Date of Patent: Jan. 14, 2025

(54) METHOD FOR THE PREDICTION OF TRAJECTORIES OF AN OUTSIDE VEHICLE USING NEURAL NETWORKS WITH CONTROL ACTION INPUTS

(71) Applicant: Robert Bosch GmbH, Stuttgart (DE)

(72) Inventors: Anh Tuan Tran, Heilbronn (DE); Hendrik Berkemeyer, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 409 days.

(21) Appl. No.: 17/669,548

(22) Filed: Feb. 11, 2022

(65) Prior Publication Data

US 2022/0258774 A1 Aug. 18, 2022

(30) Foreign Application Priority Data

Feb. 18, 2021 (DE) ..................... 10 2021 201 535.2

(51) Int. Cl.
*B60W 60/00* (2020.01)
*B60W 40/04* (2006.01)
*G06N 3/08* (2023.01)

(52) U.S. Cl.
CPC ...... *B60W 60/00272* (2020.02); *B60W 40/04* (2013.01); *G06N 3/08* (2013.01); *B60W 2554/4044* (2020.02); *B60W 2556/35* (2020.02)

(58) Field of Classification Search
CPC .......... B60W 60/00272; B60W 40/04; B60W 2554/4044; B60W 2556/35; B60W 50/0097; B60W 60/00274; B60W 2554/404; G06N 3/08; G06N 3/045
See application file for complete search history.

(56) References Cited

U.S. PATENT DOCUMENTS

| | | | |
|---|---|---|---|
| 2019/0205667 A1* | 7/2019 | Avidan | ..................... G06F 18/28 |
| 2021/0001884 A1* | 1/2021 | Alvarez | ................ B60W 40/06 |
| 2021/0201052 A1* | 7/2021 | Ranga | ...................... G06N 3/08 |
| 2021/0295171 A1* | 9/2021 | Kamenev | .................. G06T 7/70 |

* cited by examiner

*Primary Examiner* — James J Lee
*Assistant Examiner* — Alexander George Matta
(74) *Attorney, Agent, or Firm* — NORTON ROSE FULBRIGHT US LLP; Gerard A. Messina

(57) ABSTRACT

A method for a trajectory prediction for a vehicle. The method includes receiving trajectory data of a travel trajectory of a further vehicle driving in a traffic lane within a surroundings of a vehicle; detecting at least one control action performed by the further vehicle based on the trajectory data, the control action representing at least part of a driving maneuver, by which the further vehicle is controlled along the travel trajectory; ascertaining a future travel trajectory of the vehicle by taking into account the detected control action executed by the further vehicle; and providing the future travel trajectory of the further vehicle.

12 Claims, 3 Drawing Sheets

METHOD FOR THE PREDICTION OF TRAJECTORIES OF AN OUTSIDE VEHICLE USING NEURAL NETWORKS WITH CONTROL ACTION INPUTS

FIELD

The present invention relates to the prediction of trajectories for a vehicle.

BACKGROUND INFORMATION

For controlling vehicles, in particular autonomously driving vehicles, the prediction of travel trajectories to be driven by vehicles in a traffic situation is of essential importance in order to avoid collisions of individually controlled vehicles due to colliding travel trajectories. Approaches from the related art exhibit deficiencies in reliability due to the great complexity of the trajectory prediction.

SUMMARY

It is an objective of the invention to provide an improved method for the prediction of trajectories for a vehicle.

This object may be achieved by a method for the prediction of trajectories for a vehicle in accordance with the present invention. Advantageous developments of the present invention are disclosed herein.

According to one aspect of the present invention, a method is provided for predicting trajectories for a vehicle. In accordance with an example embodiment of the present inventin,l the method comprises:
- receiving trajectory data of a travel trajectory of a further vehicle driving in a traffic lane within a surroundings of a vehicle;
- detecting at least one control action performed by the further vehicle based on the trajectory data, the control action representing at least part of a driving maneuver, by which the further vehicle is controlled along the travel trajectory;
- ascertaining a future travel trajectory of the vehicle by taking into account the detected control action performed by the vehicle; and
- providing the future travel trajectory of the vehicle.

This makes it possible to achieve the technical advantage of being able to provide an improved method for predicting trajectories for a vehicle. For this purpose, control actions performed by a vehicle are detected on the basis of trajectory data of the vehicle. The control actions in this context are fundamental components of a complex driving maneuver of the vehicle. In a complex driving maneuver, for example a right-turning process, the control actions comprise for example straight-ahead driving up to a turning point of the lane, a reduction of a speed of the vehicle to a turning speed, a steering angle adjustment and corresponding cornering of the vehicle, a steering angle adjustment up to neutral position of the steering wheel, straight-ahead driving and, possibly, an acceleration of the vehicle to a straight-ahead driving speed. The mentioned control actions are provided merely by way of example and a turn-off process may comprise additional control actions.

The control actions are in this context universally defined and may be used for various driving maneuvers. Using the control actions defined in this manner in accordance with fundamental basic maneuvers, it is possible, by way of appropriate combinations of the control actions, in which a plurality of control actions are performed simultaneously or in temporal succession in appropriately defined temporal processes, to implement a plurality of different complex driving maneuvers of a vehicle.

By taking into account the control actions detected in this manner, a future travel trajectory is subsequently ascertained, the at least one control action being taken into account in the future travel trajectory in such a way that a complex driving maneuver of the vehicle is implemented in the combination of the control action and the future travel trajectory. Through the detection of the control actions, it is possible to achieve a great flexibility of the method for the prediction of trajectories. The fact that the control actions representing various driving maneuvers are detected and taken into account in the prediction of the travel trajectories allows for an unproblematic adaptation of the method to changed traffic situations. For example, a trajectory prediction of this kind, which is trained for right-hand traffic and the control actions and driving maneuvers performed in right-hand traffic, may be adapted to left-hand traffic in that the trajectory prediction is trained for the control actions relevant in left-hand traffic. Following appropriate training, the trajectory prediction is ready to detect from the trajectory data respective control actions of left-hand traffic and, by taking these control actions and corresponding driving maneuvers into account, to predict suitable travel trajectories, which are compatible with the new traffic situation, that is, with left-hand traffic. It is thereby possible to avoid having to structure the trajectory prediction completely anew.

Furthermore, it is possible to reduce the number of possible travel trajectories in that primarily those travel trajectories are taken into account in the prediction, which fit a meaningful driving maneuver and in particular fit the ascertained control actions. This makes it possible to achieve a more precise prediction of the future travel trajectories.

According to one specific embodiment of the present invention, the ascertainment of the driving maneuver and the ascertainment of the future travel trajectory are performed by a suitably trained artificial neural network, the detected control actions being used as input data for the artificial neural network.

This makes it possible to achieve the technical advantage of allowing for a precise and powerful prediction of future travel trajectories. Operating the appropriately trained artificial neural network on the basis of the detected control actions as input data makes it possible to achieve an increased flexibility of the method according to the present invention.

According to one specific embodiment of the present invention, the artificial neural network comprises a fusion layer, the fusion layer being designed to take into account a plurality of control actions as a representation of complex driving maneuvers of a vehicle for ascertaining trajectories.

This makes it possible to achieve the technical advantage that the driving maneuvers represented by the plurality of control actions make it possible to limit the prediction of the trajectories to the trajectories that result in meaningful maneuvers of the vehicle. This allows for a more precise prediction of meaningful trajectories.

According to one specific embodiment of the present invention, the at least one control action is detected from a plurality of previously known control actions, the previously known control actions being integrated as independent units into the neural network.

This makes it possible to achieve the technical advantage that an efficient detection of control actions is made possible in that for detecting the control actions on the basis of trajectory data a check is performed to determine whether and which of the previously known control actions are present in an observed driving situation.

According to one specific embodiment of the present invention, the artificial neural network is trained in accordance with a multi-task learning approach in that for each control action represented in a unit of the neural network the ascertainment of a future trajectory is trained independently.

This makes it possible to achieve the technical advantage that an efficient training of the neural network with the technical advantages of multi-task learning is made possible.

According to one specific embodiment of the present invention, semantic information regarding the travel trajectory executed by the further vehicle is integrated into the neural network via the control actions.

This makes it possible to achieve the technical advantage that the prediction of future travel trajectories is improved via the semantic information. The integration of the semantic information makes it possible to separate the prediction of the future travel trajectories from the processing of the pure raw data of the sensor system of the vehicle and to achieve the consideration of the possible driving maneuvers.

According to one specific embodiment of the present invention, the neural network is trained using a slice-based learning approach, in which selected data of respective training data sets are taken into account with heightened or lowered priority.

This makes it possible to achieve the technical advantage of an improved training process of the neural network, in which aspects of the training data, which are of heightened importance for the training, are taken into account with heightened priority.

According to one specific embodiment of the present invention, a plurality of future travel trajectories is ascertained and/or provided on the basis of the detected control action, the travel trajectories being provided with reliability values.

This makes it possible to achieve the technical advantage of being able to increase the precision of the trajectory prediction. By providing corresponding reliability values of the predicted future travel trajectories, these may be taken into account in accordance with the respective reliability values in controlling the vehicle. Travel trajectories, which represent the respective ascertained driving maneuver with high probability, may be provided accordingly with higher reliability values. In the case of a plurality of future travel trajectories, the information furthermore increases the flexibility of controlling the vehicle.

According to one specific embodiment of the present invention, control actions are detected by user-defined determined detection functions.

This makes it possible to achieve the technical advantage of allowing for a precise, reliable and determined detection of the control actions.

According to one specific embodiment of the present invention, control actions describe general actions of a vehicle and comprise: acceleration, braking, straight-ahead driving, cornering, changing lanes to the right and to the left, turning off to the right and to the left, driving off, stopping.

This makes it possible to achieve the technical advantage of providing on the basis of the control actions fundamental actions for controlling the vehicle, by which a multitude of possible driving maneuvers may be implemented.

According to one specific embodiment of the present inveiton, control actions are adapted to actions of a vehicle in city traffic and/or in overland traffic and to right-hand traffic and/or left-hand traffic.

This makes it possible to achieve the technical advantage of making it possible to take different kinds of traffic into account.

According to one specific embodiment of the present invention, the trajectory data comprise position data, speed data, acceleration data, steering angle data, the trajectory data being based on sensors of the further vehicle and/or on driving environment sensor data of the vehicle.

This makes it possible to achieve the technical advantage of allowing for a precise ascertainment of the driving situation of the vehicle on the basis of the trajectory data.

According to one specific embodiment of the present invention, map data are furthermore taken into account for detecting the at least one control action, the map data comprising a course of the traffic lane and or a position of the traffic lane and/or a location of the traffic lane with respect to further traffic lanes, and/or the ascertainment of the future travel trajectory furthermore being performed by taking the trajectory data into account.

This makes it possible to achieve the technical advantage of being able to improve the precision of the trajectory prediction further.

According to a second aspect of the present invention, a processing unit is provided, the processing unit being designed to carry out the method for the trajectory prediction for a vehicle according to one of the aforementioned specific embodiments of the present invention.

According to a third aspect of the present invention, a computer program product is provided comprising commands, which, when the program is executed by a data processing unit, prompt the latter to carry out the method for the driving assistance for a vehicle according to one of the aforementioned specific embodiments of the present invention.

BRIEF DESCRIPTION OF THE DRAWINGS

Exemplary embodiments of the present invention are explained with reference to the figures.

DETAILED DESCRIPTION OF EXAMPLE EMBODIMENTS

Figure 1:
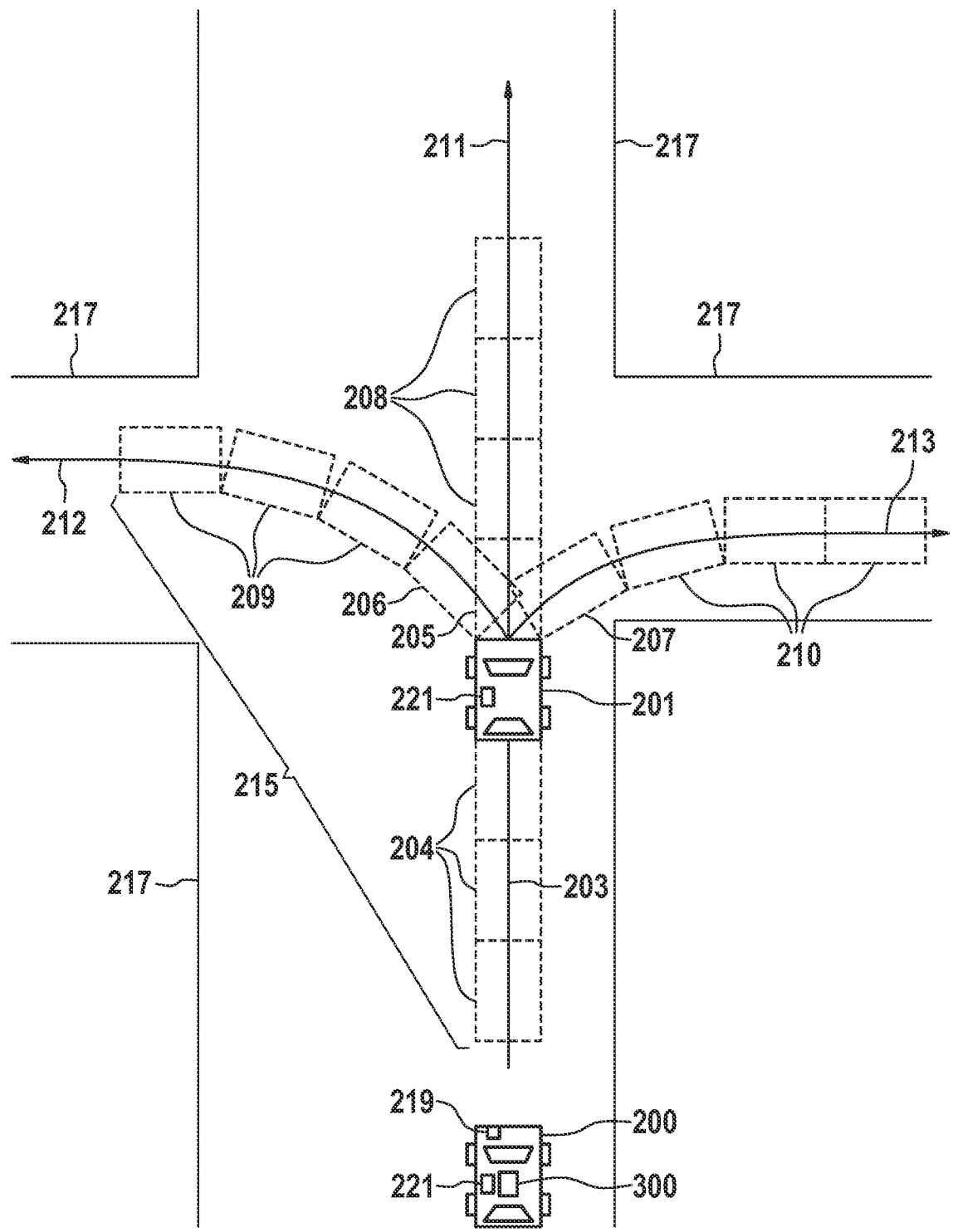
FIG. 1 shows a schematic representation of a traffic situation of a driving assistance system according to one specific example embodiment of the present invention.

FIG. 1 shows a schematic representation of a traffic situation.

FIG. 1 shows a traffic situation including a vehicle 200 and a further vehicle 201, which are respectively moved along a traffic lane 217. In the illustrated example, traffic lane 217 is developed as an intersection. This is merely by way of example and shall not limit the invention.

In the illustrated specific embodiment, vehicle 200 comprises a processing unit 300, which is configured to carry out the method according to the invention for predicting trajectories for a vehicle.

FIG. 1 shows a snap-shot of a traffic situation, in which the further vehicle 201 was moved along a traveled travel trajectory 203 along traffic lane 217 and is now, at the time of the illustrated traffic situation, located at the entrance of the crossing traffic lane 217. To move vehicle 201 along the traveled travel trajectory 203, the further vehicle 201 performed a plurality of past control actions 204. The past control actions 204 performed in temporal succession are designed here in such a way that by performing the past control actions 204 it was possible to move the further vehicle 201 along the traveled travel trajectory 203.

In the sense of the present application, control actions 204, 205, 206, 207, 208, 209, 210 are general actions of a vehicle, by which a vehicle is controllable along a predetermined travel trajectory. Control actions in this connection may comprise acceleration, braking, straight-ahead driving, cornering, lane changing both toward the right as well as toward the left, turning off, driving off or stopping. The listed examples of control actions are not conclusive and may additionally comprise further functions of the vehicle.

In the snap-shot of FIG. 1, the travel trajectory 203 traveled by the further vehicle 201 comprises further an executed control action 205, 206, 207. The executed control action 205, 206, 207 here represents the most recently executed control action of the traveled travel trajectory 203 at the time of the preparation of the snap-shot of the illustrated traffic situation.

For predicting the trajectory in accordance with the method of the invention, vehicle 200 first receives the trajectory data of the traveled travel trajectory 203 of the further vehicle 201. For this purpose, the trajectory data may be exchanged via the data communication units 221 of vehicles 200, 201 in accordance with a vehicle-to-vehicle communication between the further vehicle 201 and vehicle 200. Alternatively, the trajectory data may be based on driving environment sensor data of at least one driving environment sensor 219 of vehicle 200. The trajectory data may in this case comprise at least position data, speed data, acceleration data and steering angle data of the further vehicle 201.

On the basis of the trajectory data, at least one executed control action 205, 206, 207 is subsequently detected. According to the examples of control actions listed above, these may be executed simultaneously by a vehicle during the driving process in order to execute accordingly a complex driving maneuver. FIG. 1 shows an example of such a complex driving maneuver 215, which comprises a plurality of consecutively executed control actions 204, 206, 209, and which is executed in the illustrated exemplary representation as a left turn. For reasons of illustration, FIG. 1 shows only consecutively executed control actions. Alternatively, it is possible to execute at any time a plurality of control actions simultaneously and at the same time.

By taking into account the control action 205, 206, 207 executed by the further vehicle 201, a future travel trajectory 211, 212, 213 of the further vehicle 201 is subsequently ascertained. The future travel trajectory 211, 212, 213 is here configured in such a way that it represents an uninterrupted continuation of the most recently executed control actions 205, 206, 207.

FIG. 1 shows as the most recently executed control action 205, 206, 207 three alternative control actions, control action 205 representing straight-ahead driving of the further vehicle 201, control action 206 representing a left turn of the further vehicle 201 and control action 207 representing a right turn of further vehicle 201. In accordance with the three alternative control actions 205, 206, 207, a future travel trajectory 211 associated with control action 205 represents straight-ahead driving of vehicle 201, a future travel trajectory 211 associated with control action 206 represents a left turn of further vehicle 201 and a future travel trajectory 213 associated with control action 207 represents a right turn of further vehicle 201. The future travel trajectories 211, 212, 213 are to be executed by appropriate future control actions 208, 209, 210.

Following the ascertainment of the future travel trajectory, the travel trajectory is provided to vehicle 200 so that vehicle 200 may be appropriately controlled by taking the ascertained future travel trajectories 211, 212, 213 of further vehicle 201 into account.

In the illustrated example, only one future travel trajectory 211, 212, 213 is ascertained for each detected executed control action 205, 206, 207. Alternatively, it is possible to ascertain a plurality of alternative future travel trajectories 211, 212, 213 for each detected executed control action 205, 206, 207. In the illustrated example, the future travel trajectories 211, 212, 213 are shown merely as position information of the further vehicle 201. Alternatively, the future travel trajectories 211, 212, 213 may comprise, as indicated above, speed information, acceleration information and steering angle information of the further vehicle 201. A plurality of alternative future travel trajectories may vary in terms of the position data, acceleration data, speed data or steering angle data. When indicating a plurality of alternative future travel trajectories, the individual travel trajectories may be provided with corresponding reliability values, so that a control of vehicle 200 is able to take into account the plurality of indicated future travel trajectories 211, 212, 213 in accordance with the reliability values.

Apart from the actions of a vehicle 201, 202 indicated above, which are described by the control actions, the control actions may additionally be adapted to actions of a vehicle 201 in city traffic or in overland traffic and both to right-hand traffic as well as to left-hand traffic.

For detecting the executed control actions 205, 206, 207 based on the trajectory data of the traveled travel trajectory 203 of the further vehicle 201, it is possible to detect the control actions 205, 206, 207 from a plurality of previously known control actions by executing user-defined and determined detection functions. The determined detection functions may be trained or configured to detect, from a set of previously known control actions that describe a driving behavior of a vehicle, based on corresponding trajectory data, control actions actually executed by a vehicle in a driving situation observed via the trajectory data.

The alternatives shown in FIG. 1 of an executed control action 205, 206, 207 are intended to represent actual alternative situations. In the illustrated situation, the vehicle may execute one of the illustrated control actions 205, 206, 207, which is detected via the user-defined functions. The representation of the three alternative control actions 205, 206, 207 merely serves to illustrate the dependence of the detected control action 205, 206, 207 and of the prediction of the corresponding future travel trajectory 211, 212, 213 based on it. Different detected control actions 205, 206, 207 result in different predicted future travel trajectories 211, 212, 213. The control actions 205, 206, 207 represented as alternative control actions are here previously known to the user-defined detection functions, so that it is possible to detect, on the basis of the respective trajectory data, the corresponding control action 205, 206, 207 as present and therefore executed.

In the illustrated representation, the three alternative executed control actions 205, 206, 207, which are taken into account in determining the future travel trajectories 211, 212, 213, are represented as mutually distinguishable control actions. For reasons representability, the executed control actions 205, 206, 207 are oriented along the future descriptive travel trajectories 211, 212, 213. Control action 206 indicates a left-directed change in direction and control action 207 indicates a right-directed change in direction of vehicle 201, while control action 205 indicates straight-ahead driving. This is not to imply, however, that the executed control actions 205, 206, 207 detected by vehicle 200 comprise exclusively changes in direction of vehicle 201.

Additionally or alternatively, the executed control actions 205, 206, 207 detected by vehicle 200 may comprise control actions that are executed while the direction of vehicle 201 remains the same, for example braking actions or activations of a turn indicator. On the basis of these control actions, it is possible already prior to the initiation of a change of direction to infer corresponding driving maneuvers, for example turn-off processes.

According to one specific embodiment, the ascertainment of the future travel trajectory based on the detected executed control action 205, 206, 207 and the provision of the future travel trajectory 211, 212, 213 may be performed by an appropriately trained neural network. For this purpose, the executed control actions 205, 206, 207 detected via the user-defined and determined detection functions may be used as input data for the artificial neural network. For this purpose, the detected control actions may be represented in a numerical vector representation, and may be provided in the numerical vector representation as input data to the artificial neural network.

The artificial neural network may here comprise a fusion layer, which is designed to take into account a plurality of control actions as a representation of complex driving maneuvers 207 of a vehicle 200, 201 for ascertaining trajectories. The fusion layer allows for a vector representation of the previously known control actions or the detected control actions. The plurality of previously known control actions may for this purpose be integrated in independent units (batches) into the neural network, so that the independent units (batches) of the neural network respectively comprise exclusively data of individual previously known control actions.

In particular, the artificial neural network may be trained in accordance with a multi-task learning approach in that for each control action represented in a unit of the neural network the ascertainment of a future trajectory is trained. The individual units or batches of the artificial neural network, which respectively represent individual control actions, may thus be trained independently on respective training data of the artificial neural network to predict corresponding future travel trajectories by taking into account the respective control action of the unit or batch of the neural network. The multi-task learning approach thus makes it possible to determine a plurality of alternative future travel trajectories simultaneously.

When executing the appropriately trained artificial neural network for predicting trajectories, all future travel trajectories ascertained via the respective individual units or batches of the neural network, which respectively represent the individual previously known control actions, may subsequently be taken into account with a corresponding weighting. It is possible for example, to use only the future travel trajectories provided with a high weighting, for example with a high reliability value, for providing the future travel trajectories to the control of vehicle 200.

The artificial neural network may furthermore be trained using a slice-based learning approach, in which selected data of a respective training data set having a heightened or a lowered priority are taken into account for training the neural network. For example, driving situations that are represented in the respective training data set with a low frequency, such as for example drives in specific weather, drives at increased/reduced traffic volume, or other infrequently occurring driving situations, may be taken into account with an accordingly higher priority in the training of the neural network.

Besides the detected control actions, the trajectory data of the traveled travel trajectory 203 of the further vehicle 201 may also be used as input data for the artificial neural network for ascertaining future travel trajectories.

The integration of the previously known control actions makes it possible to integrate into the artificial neural network, in addition to the raw data of the trajectory data, also semantic information regarding driving maneuvers executed by the respective vehicle. The semantic information of the previously known control actions makes it possible to render the prediction of the future travel trajectories more precise in that the known control actions integrated into the artificial neural network define a bias function, which has the effect that future travel trajectories are preferred in the prediction that result in meaningful driving maneuvers of the vehicle in accordance with the detected executed control actions. This makes it possible to reduce the number of possible future travel trajectories to those travel trajectories that result in meaningful driving maneuvers, and that accordingly correspond with greater probability to a travel trajectory actually executed by the respective vehicle at a future point in time.

Figure 2:
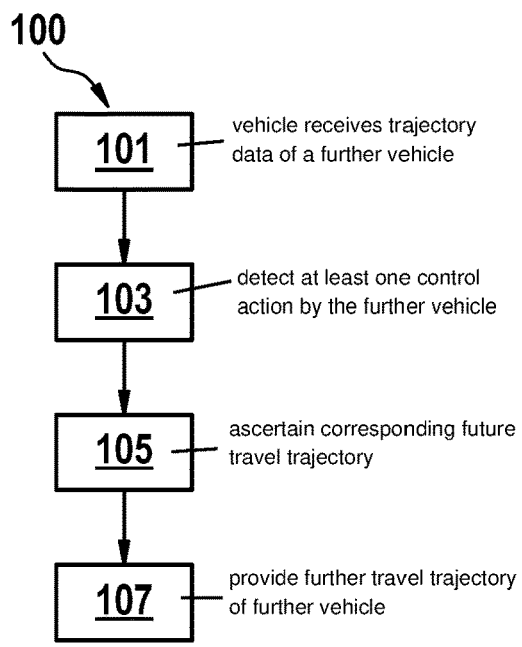
FIG. 2 shows a flow chart of a method for the trajectory prediction for a vehicle according to one specific example embodiment of the present invention.

FIG. 2 shows a flow chart of a method 100 for the trajectory prediction for a vehicle 200 according to one specific embodiment.

The method 100 according to the invention for the trajectory prediction for a vehicle 200, 201 is applicable to the driving situation shown in FIG. 1 by way of example.

In a first method step 101, vehicle 200 initially receives trajectory data of a traveled travel trajectory 203 of a further vehicle 201 driving in traffic lane 217 within the surroundings of vehicle 200.

In a further method step 103, at least one control action 205, 206, 207 executed by the further vehicle 201 is detected on the basis of the trajectory data. The executed control action 205, 206, 207 in this case represents at least a portion of a driving maneuver 215 executed or to be executed by the further vehicle 201, by which the further vehicle 201 is controllable along the traveled travel trajectory 203 or along a future travel trajectory 211, 212, 213.

In a further method step 105, a corresponding future travel trajectory 211, 212, 213 is ascertained by taking the detected control actions 205, 206, 207 executed by the further vehicle into account. The future travel trajectory 211, 212, 213 in this case represents a steady continuation of the executed control actions 205, 206, 207 and of the corresponding driving maneuver 215.

Subsequently, in a further method step 107, the future travel trajectory 211, 212, 213 of the further vehicle 201 is provided.

Figure 3:
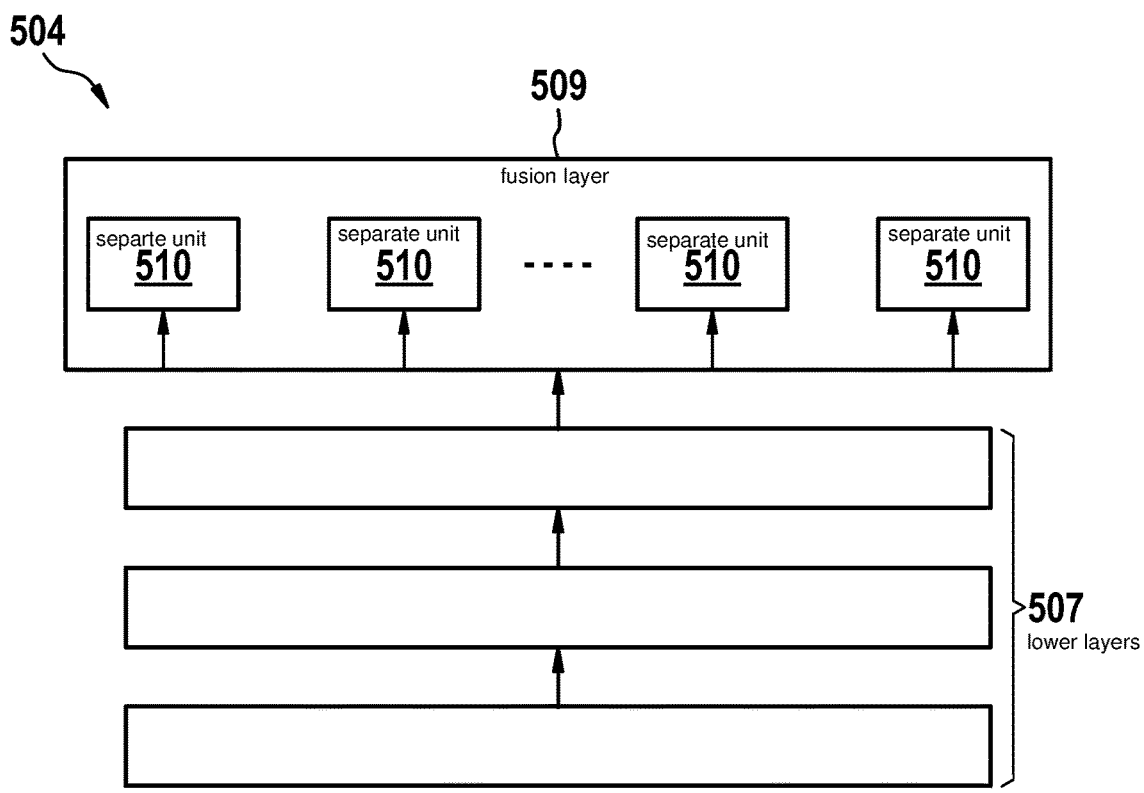
FIG. 3 shows a schematic representation of an artificial neural network for carrying out the method for the trajectory prediction for a vehicle according to one specific example embodiment of the present invention.

FIG. 3 shows a schematic representation of an artificial neural network 504 for carrying out the method 100 for the trajectory prediction for a vehicle 200, 201 according to one specific embodiment.

FIG. 3 shows by way of example a structure of a neural network 504 according to one specific embodiment of the present invention. Neural network 504 comprises a plurality of lower layers 507. Above the lower layers 507, neural network 504 comprises the fusion layer 509. A plurality of separate and independent units or batches 510 are situated within fusion layer 509. The independent units 510 respectively include data of the previously known control actions, each unit 510 exclusively comprising one individual control action.

The structure of the neural network 504 is here designed in such a way that the lower layers 507 of neural network 504 or the data integrated there are jointly available to all layers. The separate units 510 of fusion layer 509, by contrast, are operated separately. This ensures the multi-task learning approach of neural network 504.

Jointly taking into account the individual control actions of the independent units or batches 510 within fusion layer 509 ensures a semantic representation of respective driving maneuvers of a vehicle in the prediction of future travel trajectories.

In the execution of the appropriately trained neural network 504, the individual units or batches 510 of the respectively independently represented control actions are activated in accordance with the existence of a respective control action in a driving situation of a vehicle observed on the basis of corresponding trajectory data and are accordingly prompted to predict a future travel trajectory. By contrast, control actions that are not present in the observed driving situation do not result in an activation of the respective unit 510 of neural network 504 and accordingly do not contribute to the prediction of a corresponding future travel trajectory.

Figure 4:
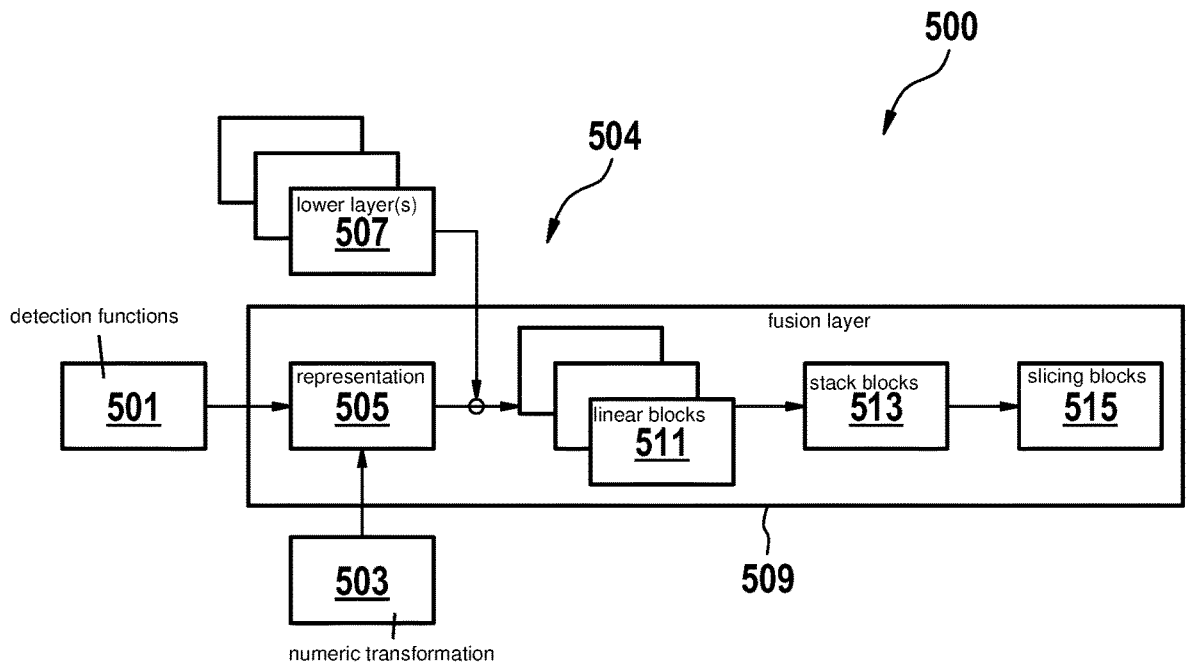
FIG. 4 shows a schematic representation of a model for carrying out the method for the trajectory prediction for a vehicle according to one specific example embodiment of the present invention.

FIG. 4 shows a schematic representation of a model for carrying out the method 100 for the trajectory prediction for a vehicle 200, 201 according to a specific embodiment.

FIG. 4 shows a schematic representation of a model 500 for carrying out the trajectory prediction. Via the defined and deterministic detection functions 501, corresponding control actions are detected on the basis of the trajectory data. The detected control actions are converted into corresponding numeric vector representations via a corresponding function for the numeric transformation 503. The totality of the corresponding vector representations of the previously known control actions forms a corresponding representation 505 of corresponding driving maneuvers comprising the respectively executed control actions. These vector representations of the driving maneuvers are combined with the data of the lower layers 507 of the neural network 504 in the fusion layer 509 and are arranged in linear blocks 511 of fusion layer 509. The data arranged in the linear blocks 511 may be rearranged in corresponding stack blocks 513 and may be used in accordance with the slice-based learning approach in slicing blocks 515 with corresponding priority for training. In the linear blocks 511, furthermore, a linear weighting of the driving maneuvers of representation 505 and of the data of lower layers 507 may be performed.

Figure 5:
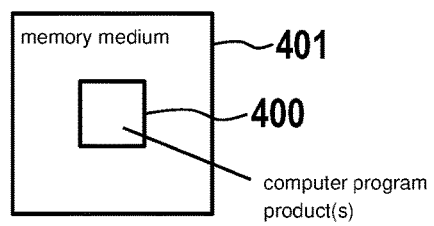
FIG. 5 shows a schematic representation of a computer program product, in accordance with an example embodiment of the present invention.

FIG. 5 shows a schematic representation of a computer program product 400.

FIG. 5 shows a computer program products 400, comprising commands, which, when the program is executed by a processing unit, prompt the latter to carry out the method 100 as recited in one of the aforementioned specific embodiments. In the illustrated specific embodiment, computer program product 400 is stored on a memory medium 401. The memory medium 301 may be any memory medium from the related art.

What is claimed is:

1. A method for trajectory prediction for a vehicle, comprising the following steps:
   receiving trajectory data of a travel trajectory of a further vehicle driving in a traffic lane within a surroundings of the vehicle;
   identifying, based on the trajectory data of the further vehicle, at least one control action performed by the further vehicle as one of a plurality of previously known control actions, the control action representing at least part of a driving maneuver by which the further vehicle is controlled along the travel trajectory;
   ascertaining, with input of the at least one identified control action into an artificial neural network, a future travel trajectory of the further vehicle by taking into account the detected control action executed by the further vehicle, wherein the previously known control actions are integrated in the artificial neural network as independent units that are independently trained for the ascertainment of the future travel trajectory of the further vehicle; and
   providing the future trajectory to a vehicle controller for controlling the vehicle.

2. The method as recited in claim 1, wherein the artificial neural network includes a fusion layer, the fusion layer being configured to take into account a plurality of control actions to combine two or more of the plurality of control actions into a representation of one or more composite driving maneuvers of the further vehicle.

3. The method as recited in claim 1, wherein semantic information regarding the travel trajectory executed by the further vehicle is integrated into the neural network via the control actions.

4. The method as recited in claim 1, wherein the neural network is trained using a slice-based learning approach, in which selected data of respective training data sets are taken into account with heightened or lowered priority.

5. The method as recited in claim 1, wherein based on the detected at least one control action, a plurality of future travel trajectories is ascertained and/or provided, and the future travel trajectories are provided with reliability values.

6. The method as recited in claim 1, wherein the detection of the at least one control action is performed by user-defined determined detection functions.

7. The method as recited in claim 1, wherein each of the at least one control action describes and includes a general action of the further vehicle including at least one of: acceleration, braking, straight-ahead driving, cornering, changing lanes to the right and to the left, turning off to the right and to the left, driving off, stopping.

8. The method as recited in claim 7, wherein each of the at least one control action is adapted to actions of a vehicle in city traffic and/or in overland traffic, and to right-hand traffic and/or left-hand traffic.

9. The method as recited in claim 1, wherein the trajectory data include position data, speed data, acceleration data, steering angle data, and wherein the trajectory data are based on sensors of the further vehicle and/or on driving environment sensor data of the vehicle.

10. The method as recited in claim 1, wherein map data are taken into account for detecting the at least one control action, and wherein the map data includes a course of the traffic lane and/or a position of the traffic lane and/or a location of the traffic lane with respect to further traffic lanes, and/or wherein the ascertainment of the future travel trajectory is performed by taking the trajectory data into account.

11. A processing unit comprising at least one processor, the at least one processor being programmed to predict a trajectory prediction for a vehicle, the processing unit configured to:
- receive trajectory data of a travel trajectory of a further vehicle driving in a traffic lane within a surroundings of the vehicle;
- identify, based on the trajectory data of the further vehicle, at least one control action performed by the further vehicle as one of a plurality a plurality of previously known control actions, the control action representing at least part of a driving maneuver by which the further vehicle is controlled along the travel trajectory;
- ascertain, with input of the at least one identified control action into an artificial neural network, a future travel trajectory of the further vehicle by taking into account the detected control action executed by the further vehicle, wherein the previously known control actions are integrated in the artificial neural network as independent units that are independently trained for the ascertainment of the future travel trajectory of the further vehicle; and
- provide the future trajectory to a vehicle controller for controlling the vehicle.

12. A non-transitory computer-readable medium on which is stored a computer program for trajectory prediction for a vehicle, the computer program, when executed by a computer, causing the computer to perform the following steps:
- receiving trajectory data of a travel trajectory of a further vehicle driving in a traffic lane within a surroundings of the vehicle;
- identifying, based on the trajectory data of the further vehicle, at least one control action performed by the further vehicle as one of a plurality of previously known control actions, the control action representing at least part of a driving maneuver by which the further vehicle is controlled along the travel trajectory;
- ascertaining, with input of the at least one identified control action into an artificial neural network, a future travel trajectory of the further vehicle by taking into account the detected control action executed by the further vehicle, wherein the previously known control actions are integrated in the artificial neural network as independent units that are independently trained for the ascertainment of the future travel trajectory of the further vehicle; and
- providing the future trajectory to a vehicle controller for controlling the vehicle.

\* \* \* \* \*